US012749380B2

(12) United States Patent
Capuano et al.

(10) Patent No.: US 12,749,380 B2
(45) Date of Patent: Sep. 29, 2026

(54) ITEM TYPE IDENTIFICATION FOR CHECKOUT VERIFICATION

(71) Applicant: NCR Voyix Corporation, Atlanta, GA (US)

(72) Inventors: German Capuano, Tucker, GA (US); Matthew K. Farrow, Canton, MA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/216,781

(22) Filed: Jun. 30, 2023

(65) Prior Publication Data

US 2025/0006018 A1 Jan. 2, 2025

(51) Int. Cl.

*G07G 1/00* (2006.01)
*G06V 10/774* (2022.01)
*G06V 20/60* (2022.01)

(52) U.S. Cl.

CPC ......... *G07G 1/0045* (2013.01); *G06V 10/774* (2022.01); *G06V 20/60* (2022.01)

(58) Field of Classification Search

CPC .. G07G 1/0045; G07G 1/0036; G07G 1/0063; G06V 10/774; G06V 20/60; G06N 20/00; G06Q 20/18; G06Q 20/208
See application file for complete search history.

(56) References Cited

U.S. PATENT DOCUMENTS

| | | | | |
|---|---|---|---|---|
| 12,026,736 B1 * | 7/2024 | Maxwell | ................ | G06Q 10/30 |
| 12,394,205 B1 * | 8/2025 | Gong | ...................... | G06V 20/52 |
| 2019/0057438 A1 * | 2/2019 | Dhankhar | .............. | G01G 19/40 |
| 2019/0220692 A1 * | 7/2019 | Wu | .......................... | G06N 3/08 |
| 2021/0110371 A1 * | 4/2021 | Garner | ................. | G06V 10/776 |
| 2022/0277313 A1 * | 9/2022 | Migdal | ................ | G06Q 30/018 |
| 2022/0392209 A1 * | 12/2022 | Bossard | ............... | G06V 10/987 |
| 2023/0368625 A1 * | 11/2023 | Sanil | ...................... | G06Q 20/18 |
| 2024/0029274 A1 * | 1/2024 | Wang | ...................... | G06T 7/248 |
| 2024/0354731 A1 * | 10/2024 | Pandey | ................ | G06Q 20/208 |
| 2025/0097566 A1 * | 3/2025 | He | ...................... | G06F 3/04845 |

* cited by examiner

*Primary Examiner* — Sonji N Johnson

(74) *Attorney, Agent, or Firm* — Schwegman Lundberg & Woessner, P.A.

(57) ABSTRACT

During a transaction at a terminal, an operator of a terminal indicates that an item is a produce item. An image of the item is provided as input to a machine learning model which determines whether the item is a consumer packaged good (CPG) item type or a produce item (e.g., a non-CPG item type). When the model determines the item is a CPG item type, the transaction is suspended for an audit of the item.

20 Claims, 3 Drawing Sheets

ITEM TYPE IDENTIFICATION FOR CHECKOUT VERIFICATION

BACKGROUND

Theft at customer self-checkouts is a substantial problem for retailers. Customers can engage in fraudulent activity at self-checkouts in a variety of ways. For example, a customer may perform a price lookup (PLU) and enter a PLU code for a produce item into the self-checkout's interface when the item being identified as produce is in reality a higher priced consumer packaged good (CPG). In another example, the customer may indicate that an item is a lower-priced produce item, such as bananas, when the item is actually a more costly steak.

SUMMARY

In various embodiments, a system and methods for verifying an item's type or classification during a checkout is presented. One or more machine learning models ("models" or "MLMs") are trained to distinguish an image of a consumer packaged good (CPG) from an image of a non-CPG item. More specifically, during a transaction, an operator of a terminal may identify an item as produce, i.e., as being a produce item type. At least one image of the item is provided to the model(s) and the model(s) generate an output indicative of a determination as to whether the item is a CPG item type or a non-CPG item type. When the model(s) determine the item is of a CPG item type, the transaction is suspended for an audit of the item before the transaction is permitted to complete.

DETAILED DESCRIPTION

Figure 1:
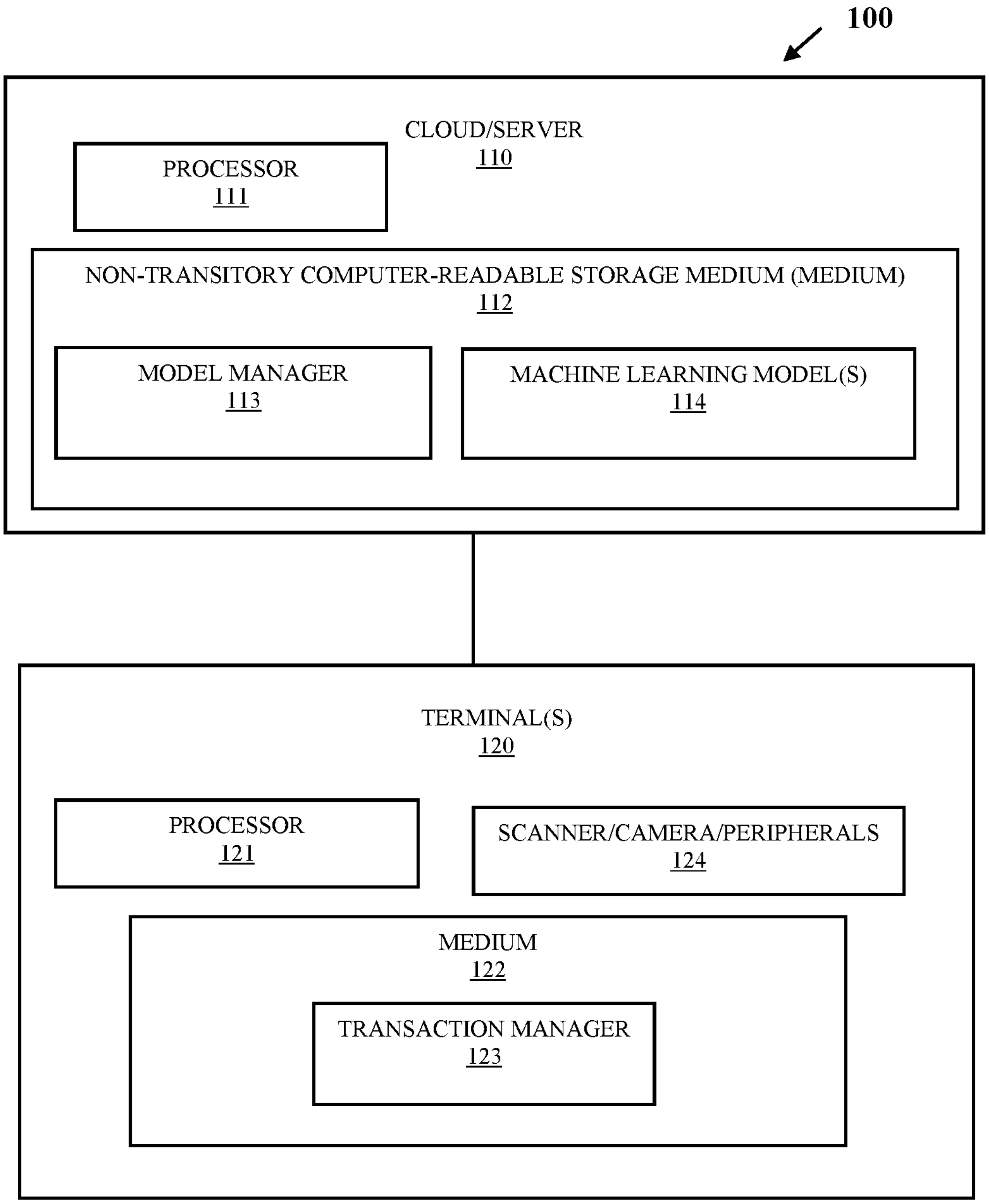
FIG. 1 is a diagram of a system for verifying an item's type or classification during a checkout, according to an example embodiment.

Increasingly retailers are driving their customers to self-checkouts at self-service terminals (SSTs) for a variety of reasons. Self-checkout lanes can be increased during heavy customer traffic without the need for extra staff and self-checkout lanes can also be reduced during light customer traffic without decreasing store staffing. Moreover, one store attendant can manage a whole bank of SSTs, such that the average number of cashiers needed by a store can be reduced as compared to stores with more cashier-assisted point-of-sale (POS) terminals. Also, during the pandemic, in some stores, cashier-assisted checkouts were unavailable, and customers were forced to use the SSTs for checkouts since self-checkouts were believed to reduce virus exposure for both customers and store staff. Partially as a result of the pandemic policies, retail customers are now more willing to accept and adopt self-checkout technology than was the case pre-pandemic.

Despite these benefits, self-checkouts at the same time present security challenges for stores since customers can commit theft or fraud easier at self-checkouts than at cashier-assisted checkouts. A variety of self-checkout theft prevention technologies exist in the industry. For example, a security bag scale records a scanned item's weight when the customer places the item in a bag on the scale. If the bag scale records an item weight that is outside a known weight range for the item, the transaction can be interrupted for an attendant to review and/or audit. When SSTs were not widely adopted, the known weight ranges defined by retailers were strict so as to catch even the smallest of mismatched item weights. This is no longer feasible with wider customer use of the SSTs since tighter weight ranges interrupt far too many checkouts and produce far too many false positives. In fact, some retailers have eliminated the bag security scales altogether because of customer frustrations. Furthermore, many customers are unable/unwilling to fit oversized or heavy items onto a small bag scale, opting instead to place the items in their carts.

Some self-checkout security technologies attempt to count items appearing during a transaction at an SST using video of the transaction area. The video item count is then compared to a scanned item count produced by the SST such that when a discrepancy exists, a transaction intervention and attendant audit can be initiated for the transaction.

None of the aforementioned security techniques, however, address a particular type of self-checkout fraud-a customer attempting to identify an item of a transaction as being a produce item, when in fact, the item is a consumer packaged good (CPG) or other non-produce item. A bag scale approach may not catch this scenario when the CPG's weight is similar to the weight of the customer-identified produce item and a video item count would likely not catch this mode of theft either since the total item count detected in the transaction video will likely match the item count produced by the SST. In fact, the customer is not trying to avoid scanning an item altogether; rather, the customer is trying to falsely identify an item as a lower cost produce item.

The technical solution disclosed herein provides an efficient and accurate item type classification that addresses, among other things, a particular type of retail shrinkage-customer identification of a non-produce item (e.g., a CPG) as a lower-cost produce item during a self-checkout. The item type classification is used to either confirm or reject that an item presented at the self-checkout is a produce item as stated by the customer. One or more machine learning models (hereinafter "models" and/or "MLMs") are trained on item images to classify the item as either a produce item or a non-produce item. The item classifications are provided in transaction workflows to transaction managers of SSTs. The transaction managers use the item classifications as a verification mechanism to ensure customers are not identifying non-produce items as produce items during self-checkouts.

As used herein, a "CPG" may include any item that is not a produce item. Thus, for purposes of the discussion that follows, a CPG can include a deli item, a bakery item, a dairy item, consumable beverages, consumer packaged foods, non-food items, medications, plants, flowers, etc. A "produce item," on the other hand, includes fruits, vegetables, mushrooms, nuts, herbs, any other farm-produced item, any item for which a barcode is not commonly used and/or which is sold by weight (e.g., candy, coffee ground by the customer in the store, etc.).

Within this initial context, various embodiments are now presented with reference to FIG. 1. FIG. 1 a is a diagram of a system 100 for verifying an item's type or classification during a checkout, according to an example embodiment. It is to be noted that the components are shown schematically in greatly simplified form, with only those components relevant to understanding of the embodiments being illustrated.

Furthermore, the various components illustrated in FIG. 1 and their arrangement is presented for purposes of illustration only. It is to be noted that other arrangements with more or less components are possible without departing from the teachings of verifying an item's type or classification during a checkout as presented herein and below.

The system 100 includes a cloud 110 or a server 110 (herein after just "cloud 110") and a plurality of terminals 120. Cloud 110 includes a processor 111 and a non-transitory computer-readable storage medium (hereinafter "medium") 112, which includes executable instructions for a model manager 113 and one or more models 114. The instructions when executed by processor 111 perform operations discussed herein and below with respect to 113 and 114.

Each terminal 120 includes a processor 121 and medium 122, which includes executable instructions for a transaction manager 123. Each terminal 120 further includes a scanner/camera/peripherals 124 to capture at least one image of an item during a transaction at the corresponding terminal 120. The instructions when executed by processor 121 perform operations discussed herein and below with respect to 123.

Initially, at least one model 114 is trained on images depicting a plurality of items, where a subset of item images are of CPG items (i.e., "non-produce) and a subset of item images are of produce items. During training, the model 114 is provided an actual item type classification that is expected as output for each of the images in the training data set. Through this training process, model 114 is configured to provide an item type classification based on an item image received during a transaction. In an embodiment, the images are preprocessed before being provided to model 114 for training. For example, the item images can be cropped with background details associated with surfaces and surrounds of a given terminal 120 removed from the images and each image size may be reduced to a smaller number of pixels. In another example, the brightness of the images is normalized. In an embodiment, more than one item image is passed during training to model 114, each item image being associated with a different angle of focus of the item on a surface of a corresponding terminal 120.

In an embodiment, model 114 is trained to provide item type sub-classifications for a given determined CPG classification. For example, the model 114 may be trained to identify item type sub-classifications for a determined CPG classification, such as a deli classification, a bakery classification, a beverage classification, a packaged food classification, a medication classification, a non-consumable classification, a flower or plant classification, etc.

In an embodiment, each of a plurality of models 114 is separately trained to output a respective corresponding sub-classification for a given determined CGP classification. For example, one model 114 may determine whether an item image is a CPG item type or not, and assuming the item image is associated with a CPG item type, a plurality of second models 114 may execute in parallel to determine whether the item image is associated with a given sub-item type. For example, a first model 114 may determine, based on an item image, that the item is a CPG item type, a second model 114 may determine if the item image is a bakery item type, a third model may determine if the item image is a deli item type, and so on. In an embodiment, each model 114 is trained to identify a specific CPG sub-classification, and an item image is passed to the models 114 in parallel such that each model 114 outputs a determination indicating whether the imaged item is a corresponding sub-item type that the model 114 was trained to identify.

Following training of the model(s) 114, a test dataset of item images is used to test the f1 value(s) of the model(s) 114. Once acceptable f1 value(s), accuracy values, and/or custom precision and recall metrics are attained, the model(s) is/are released to production for use by model manager 113 during transactions at terminals 120.

A transaction workflow processed by transaction manager 123 is modified to detect when an operator of terminal 120 enters a selection into a transaction interface of manager 123 which identifies an item in a transaction as being a produce item. Manager 123 obtains one or more images of the item from a scanner 124 or camera 124 and provides the item images to model manager 113.

Model manager 113 provides the item image(s) as input to model(s) 114 and receives as output a confidence score indicative of a determined likelihood that the item is a CPG item type or not. When the confidence score exceeds a threshold confidence level, model manager 113 sends the item type classification provided as output from model(s) 114 back to transaction manager 123. In an embodiment, a sub-item type for a CPG item type is received as output from one or more models 114 and model manager 113 provides the sub-item type back to transaction manager 123.

In an embodiment, when the received item type is a CPG item type or a CPG sub-item type, transaction manager 123 is further modified to obtain a model image for the corresponding item type and display the model image to the operator of terminal 123 during the transaction. The operator is asked to confirm whether the item is the displayed item. If the operator continues to assert that the item is a produce item, manager 123 interrupts the transaction for an attendant intervention to audit the item of the transaction on behalf of the operator. If the attendant confirms the item is in fact a produce item, manager 123 alerts model manager 113. Model manager 113 flags the item image(s) for the incorrectly identified CPG item type to be used in subsequent training of the model(s) 114. In this manner, a dynamic feedback training loop is established based on confirmed attendant results for the transactions that improves f1 value(s) of the model(s) over time as more transactions are processed by operators at terminals 120.

In an embodiment, the specific price lookup (PLU) code entered by an operator that indicates an item is a produce item can be received from transaction manager 123. Model(s) 114 are trained on both item images and specific operator-provided PLU codes to determine whether an item depicted in a given item image corresponds to the operator-provided PLU code. In this embodiment, the item images on which the model(s) 114 are trained include produce item images and corresponding PLU codes. Transaction manager 123 provides the item image(s) and operator-entered PLU code to model manager 113, which provides the item image and PLU code as input to model(s) 114. Model(s) 114 output a confidence value reflecting a likelihood that the item image and PLU code are in agreement or not and model manager 113 compares the confidence value against a threshold confidence value. When the threshold confidence level is met, model manager 113 instructs transaction manager 123 to proceed with the transaction. When the threshold confidence value is not met, model manager 113 instructs manager 123 to suspend the transaction and dispatch an attendant to the terminal 120 to audit the item.

In an embodiment, transaction manager 123 is modified to provide the corresponding item image(s) to model manager 113 as soon as an operator initiates a produce PLU search on the terminal 120 for the item. In another embodiment, transaction manager 123 waits to send the item image(s) to model manager 113 until a PLU code is actually selected/entered into the transaction interface.

In an embodiment, the threshold confidence values are configured by the retailer for each store. That is, during a transaction, a terminal identifier for the terminal 120 allows model manager 113 to identify a store and a retailer and access a corresponding configured threshold confidence value set by that retailer for that store.

In an embodiment, model manager 113 provides the threshold confidence value and/or the item type back to transaction manager 123. This causes the transaction manager 123 to determine when the item is not the purported produce item as indicated by the operator of the terminal 120 and to suspend the transaction for an item audit by an attendant.

In an embodiment, operations associated with model manager 113 and/or model(s) 114 are performed by and processed on the terminals 120. In an embodiment, the operations of model manager 113 are performed by transaction manager 123 and the operations associated with model(s) 114 are performed by a separate model on terminal 120 accessible to transaction manager 123.

In an embodiment, terminal 120 is an SST or a point-of-sale (POS) terminal. In an embodiment, the operator of the terminal 120 is a customer when the terminal 120 is an SST. In an embodiment, the operator of the terminal 120 is a cashier when the terminal 120 is a POS terminal.

One now appreciates how an efficient and accurate determination can be made during a transaction to confirm or reject whether a given item is a produce type when the operator asserts the item is a produce type. If the operator provides a PLU code for the asserted produce item type, the PLU code can be used to determine whether the item is associated with the PLU code. One or more models 114 may be trained to use the item images and/or any provided PLU code to determined whether the item is a CPG item type and/or one or more sub-CPG item types. Embodiments of the technology disclosed herein obviate the need to rely on an operator's truthfulness in identifying a transacted item as a produce item by providing an efficient and accurate classification of an item as a produce item or a non-produce item. As such, embodiments of the disclosed technology provide a technical solution that can detect when the operator is attempting to cheat during a transaction by claiming that a CPG item is a lower-cost produce item.

Figure 2:
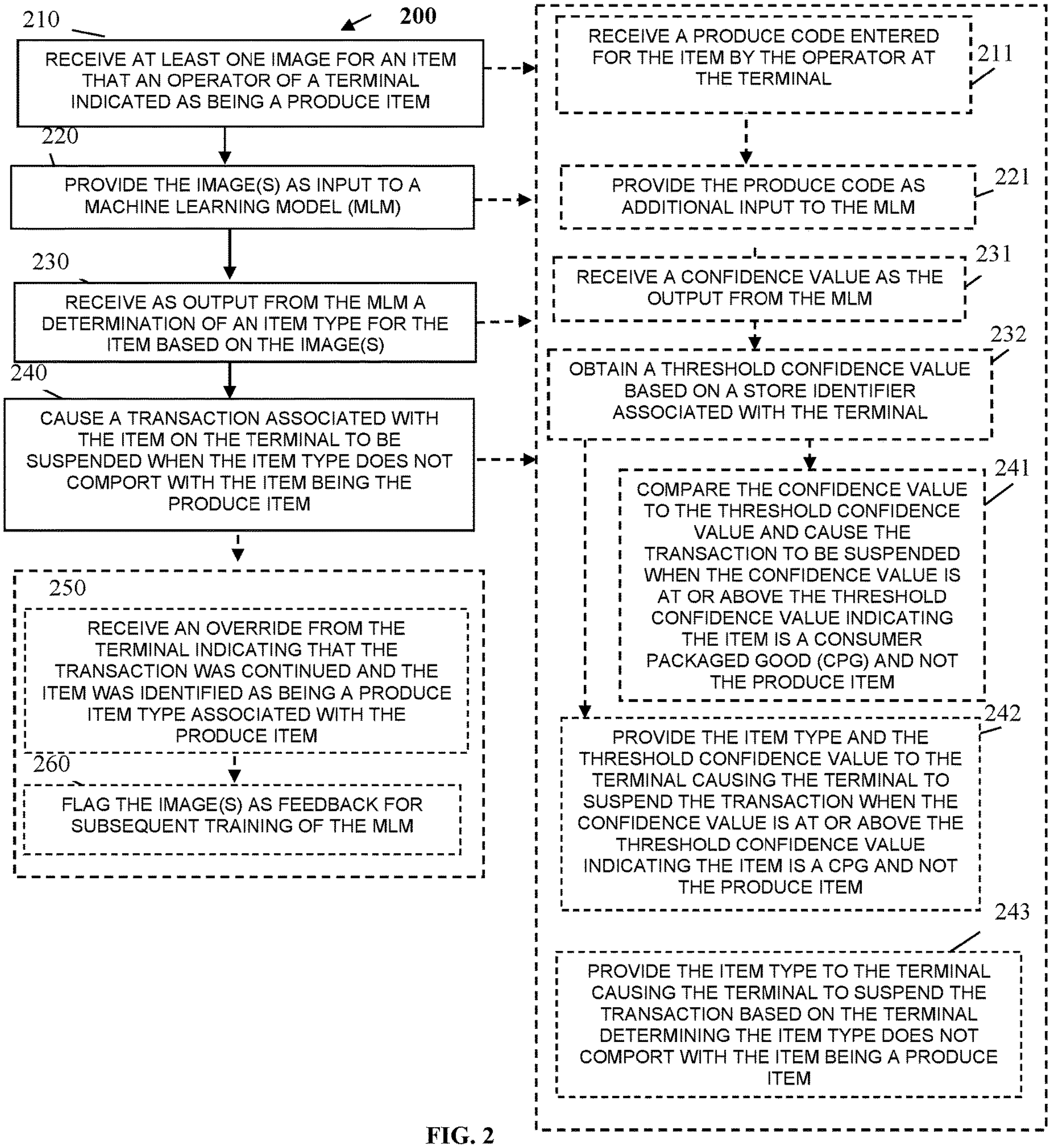
FIG. 2 is a flow diagram of a method for verifying an item's type or classification during a checkout, according to an example embodiment.

The above-referenced embodiments and other embodiments of the disclosed technology are now discussed with reference to FIGS. 2 and 3. FIG. 2 is a flow diagram of a method 200 for verifying an item's type or classification during a checkout, according to an example embodiment. The software module(s) that implements the method 200 is referred to as an "item type verification manager." The item type verification manager is implemented as executable instructions programmed and residing within memory and/or a non-transitory computer-readable (processor-readable) storage medium and executed by one or more processors of one or more devices. The processor(s) of the device(s) that executes the item type verification manager may be specifically configured and programmed to process the item type verification manager. The item type verification manager has access to one or more network connections during its processing. The connections can be wired, wireless, or a combination thereof.

In an embodiment, the device that executes the item type verification manager is cloud 110 or server 110. In an embodiment, server 110 is a server of a given retailer that manages multiple stores, each store having a plurality of terminals 120. In an embodiment, terminal 120 is an SST or a POS terminal. In an embodiment, the item type verification manager is some, all, or any combination of, model manager 113 and one or more models 114.

At 210, item type verification manager receives at least one image for an item when an operator of the terminal indicates that the item is a produce item. In an embodiment, the operator selects a PLU code based on a search for produce items through a transaction interface of a transaction manager 123 on the terminal during the transaction. In an embodiment, the transaction manager 123 provides the image for the item as soon as the transaction manager 123 detects a PLU code search initiated on the terminal 120. In another embodiment, the transaction manager 123 waits to provide the image until the operator selects a particular PLU code.

In an embodiment, at 211, the item type verification manager receives a produce code (e.g., a produce PLU code) for the item. Here, the operator either manually enters the produce code for the item through the transaction interface or the operator enters/selects the produce code after initiating a PLU code search for the item. In an embodiment, the image for the item is received with the PLU code.

At 220, the item type verification manager provides the image as input to a model 114. The model 114 determines an item type or an item classification from the image.

In an embodiment of 211 and 220, at 221, the item type verification manager provides the produce code as additional input to the model 114. That is, the model 114 was trained on providing an item type determination based on item images and operator-provided PLU or produce codes.

At 230, the item type verification manager receives as output from the model 114 a determination of an item type for the item based on the image. In an embodiment, the determination indicates whether the item is a CPG or not a CPG.

In an embodiment, at 231, the item type verification manager receives a confidence value as the output from the model 114. In an embodiment, the model 114 is trained to provide a scalar confidence value representing a percentage likelihood between 0 and 100 that an item in an item image is a CPG or not a CPG.

In an embodiment, at 232, the item type verification manager obtains a threshold confidence value based on a store identifier or a retailer identifier associated with the terminal 120. In an embodiment, a plurality of threshold confidence values can be maintained by item type verification manager, where each threshold confidence value is associated with a specific store, a specific retailer, and/or in some instances a specific terminal 120. The item type verification manager obtains the proper threshold confidence value based on a terminal identifier for the terminal 120 that supplies the image of the item.

At 240, the item type verification manager causes a transaction associated with the item on the terminal 120 to be suspended when the item type classification outputted by the model does not indicate that the item is the produce item. That is, when the model's determination indicates that the item is a non-produce item type, the transaction is suspended to enable an attendant to verify whether or not the item is in fact a produce item as is being asserted by the operator of the terminal 120.

In an embodiment of 232 and 240 at 241, the item type verification manager compares the confidence value outputted by the model to the threshold confidence value and causes the transaction to be suspended when the confidence value is at or above the threshold confidence value. This indicates the item is a CPG and is not the produce item as is being asserted by the operator of the terminal 120.

In an embodiment of 232 and 240 at 242, the item type verification manager provides the item type and the threshold confidence value to the terminal 120. The terminal evaluates the item type and suspends the transaction when the confidence value is at or above the threshold confidence value. Again, this indicates the item is a CPG and is not a produce item as is being asserted by the operator of the terminal 120.

In an embodiment, at 243, the item type verification manager provides the item type to the terminal 120. The terminal 120 evaluates the item type determination in view of rules maintained on or accessible to the terminal 120 and the terminal 120 determines the item type does not comport with the item being a produce item as is being asserted by the operator of the terminal 120.

In an embodiment, at 250, the item type verification manager receives an override from the terminal 120 indicating that the transaction was resumed. The override is received responsive to an audit confirming that the item is a produce item type associated with the produce item. In this embodiment, the determination received at 230 indicated that the item type was a type not associated with the produce type, the transaction was suspended at the terminal, and the determination was overridden by an attendant that performed an item audit for the transaction.

In an embodiment of 250 and at 260, the item type verification manager flags the image(s) of the item used as input to the model 114 for subsequent training of the model 114. The override is used as feedback to continuously train model 114 when the model's determination was incorrect by retaining the corresponding item images for re-training of the model 114 during subsequent training sessions.

Figure 3:
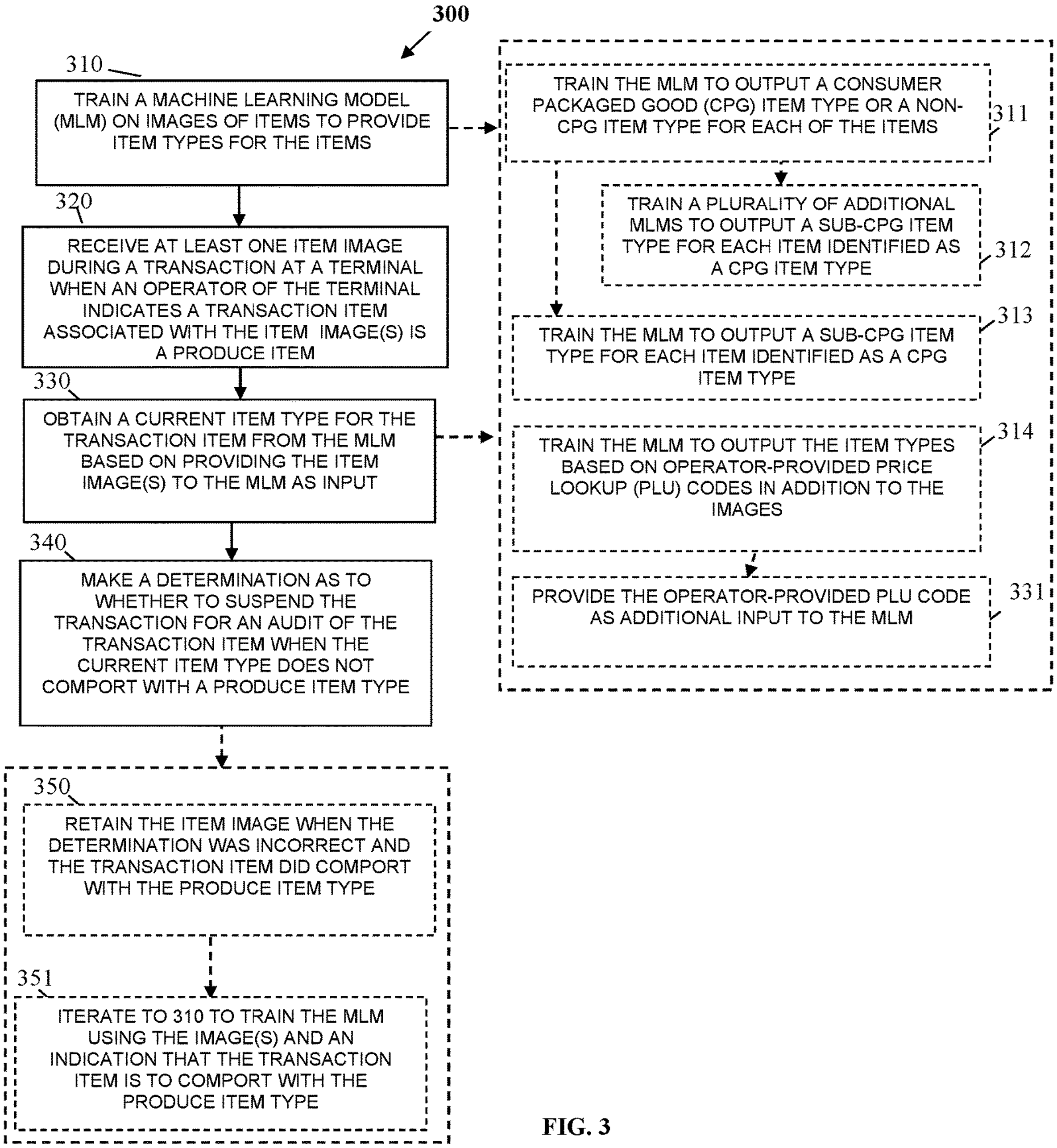
FIG. 3 is a flow diagram of another method for verifying an item's type or classification during a checkout, according to an example embodiment.

FIG. 3 is a flow diagram of a method 300 for verifying an item's type or classification during a checkout, according to an example embodiment. The software module(s) that implements the method 300 is referred to as a "produce item verifier." The produce item verifier is implemented as executable instructions programmed and residing within memory and/or a non-transitory computer-readable (processor-readable) storage medium and executed by one or more processors of one or more devices. The processor(s) of the device(s) that executes the produce item verifier may be specifically configured and programmed to process the produce item verifier. The produce item verifier has access to one or more network connections during its processing. The connections can be wired, wireless, or a combination thereof.

In an embodiment, the device that executes the produce item verifier is cloud 110 or server 110. In an embodiment, server 110 is a server of a given retailer that manages multiple stores, each store having a plurality of terminals 120. In an embodiment, terminal 120 is an SST or a POS terminal. In an embodiment, the produce item verifier is some, all, or any combination of, model manager 113, one or more models 114, and/or method 200. In an embodiment, the produce item verifier presents another, and in some ways, an enhanced processing perspective to that which was discussed above with reference to method 200 of FIG. 2.

At 310, produce item verifier trains at least one model 114 on images of items to provide item types for the items. In an embodiment, at 311, the produce item verifier trains the model 114 to produce a CPG item type or a non-CPG item type for each of the items.

In an embodiment of 311 and at 312, the produce item verifier trains a plurality of additional models 114 to produce a sub-CPG item type for each item identified as a CPG item type. The plurality of models 114 may be processed in parallel to produce respective corresponding sub-CPG item types based on an input image that has been classified as a CPG item type.

In an embodiment of 311 and at 313, the produce item verifier trains a single model 114 to output any one of multiple sub-CPG item types for each CPG classified item. In this embodiment, the model 114 may be trained to identify not only whether a given item is a CPG item type but also specific sub-CPG item types for a CPG classified item type.

In an embodiment, at 314, the produce item verifier trains the model 114 on operator-provided PLU codes along with the images to provide the item types. This can be useful when the model 114 has constraints associated with model images linked to PLU codes to rapidly discern and provide an item type for a given item image. For example, a constraint may be a produce item in a special color bag indicating that the produce item is an organic produce item type as opposed to a non-organic produce item type. Other constraints, by way of example only, include a red die stained on a portion of the produce item, a specialized sticker placed on a portion of the produce item, an UV or an IR mark or notation made on a portion of the produce item to indicate the produce type is an organic produce item type.

At 320, the produce item verifier receives at least one item image during a transaction at terminal 120. The image is of a transacted item and is received responsive to an operator of the terminal 120 indicating that the transacted item is a produce item. The image is received from the terminal 120 either when a PLU produce code search is initiated within the transaction interface of transaction manager 123 or after the operator performs a PLU produce code search and selects or otherwise enters a specific PLU code associated with a produce item.

In an embodiment of 314 and 330 at 331, the produce item verifier provides the operator-provided PLU code as additional input to the model 114. This is a situation where the transaction manager 123 provides both the operator-provided PLU code and the item image once the PLU code is entered or selected by the operator through the transaction interface.

At 340, the produce item verifier makes a determination as to whether to suspend the transaction for an audit of the transaction item based on the current item type not comporting with a produce item type. The item type determination is made on an item type that is not a produce item type such that there is at least a threshold likelihood that the item is not a produce item when the model outputs the item type.

In an embodiment, at 350, the produce item verifier retains or flags the item image when the determination was incorrect. In other words, model 114 determines the item type and the item type is known not to be a produce item type, but an actual audit of the transaction revealed that the transaction item was in fact a produce item type. These incorrect determinations, which are identified during iterations of produce item verifier at 320 for the transaction and additional transactions, along with the corresponding item images are saved as feedback for subsequent training of model 114 at 310. Thus, in an embodiment of 350 and at 351, the produce item verifier periodically iterates to 310 to retrain the model 114 using the item images and indications that the corresponding transaction items are the produce item type and not the item types originally provided by model 114.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving at least one item image for an item that an operator of a terminal indicated as being a produce item during a transaction workflow that is modified to detect when the operator of the terminal enters a selection into a transaction interface which identifies the item in a transaction as being the produce item;

preprocessing the at least one item image by cropping background image data from the at least one item image and normalizing brightness of the at least one item image before providing the at least one item image as input to a machine-learning model (MLM);

providing the at least one item image as input to the MLM;

receiving as output from the MLM a determination as to an item type for the item based on the at least one item image;

causing a transaction associated with the item on the terminal to be suspended based on the item type outputted by the MLM not comporting with the item being is the produce item;

wherein the MLM is trained on item images to classify the item as either a produce item or a non-produce item; and wherein the MLM outputs a confidence score indicative of a determined likelihood that the item is a non-produce item type and the confidence score used in the causing.

2. The method of claim 1 further comprising:

receiving an override from the terminal indicating that the transaction was resumed, wherein the override is received responsive to an audit confirming that the item is a produce item type associated with the produce item.

3. The method of claim 2 further comprising:

flagging the at least one item image as feedback for subsequent training of the MLM.

4. The method of claim 1, wherein receiving the at least one item image further includes receiving a produce code entered for the item by the operator at the terminal.

5. The method of claim 4, wherein providing further includes providing the produce code as additional input to the MLM.

6. The method of claim 1, wherein receiving the output further includes receiving a confidence value as the output.

7. The method of claim 6, wherein receiving the confidence value further includes obtaining a threshold confidence value based on a store identifier associated with the terminal.

8. The method of claim 7, wherein causing further includes comparing the confidence value to the threshold confidence value and causing the transaction to be suspended when the confidence value is at or above the threshold confidence value indicating the item is a particular consumer packaged good CPG and not the produce item.

9. The method of claim 7, wherein causing further includes providing the item type and the threshold confidence value to the terminal causing the terminal to suspend the transaction when the confidence value is at or above the threshold confidence value indicating the item is a particular consumer packaged good and not the produce item.

10. The method of claim 1, wherein causing further includes providing the item type to the terminal causing the terminal to suspend the transaction based on the terminal determining the item type does not comport with the item being the produce item.

11. A method, comprising:

training a machine-learning-model (MLM) on images of items to provide item types for the items, wherein during training, the MLM is provided an actual item type classification that is expected as output for each of the images in a training data set, and through a this training process, the MLM is configured to provide an item type classification based on an item image received during a particular transaction;

receiving at least one item image during a transaction at a terminal responsive to an operator of the terminal indicating that a transaction item associated with the at least one item image is a produce item;

obtaining a current item type for the transaction item from the MLM by providing the at least one item image to the MLM as input;

making a determination to suspend the transaction for an audit of the transaction item based on the current item type not comporting with a produce item type entered for the transaction;

wherein training further comprises training the MLM on images depicting a plurality of items, a subset of item images are of non-produce items and a subset of item images are of produce items;

preprocessing the images prior to providing the images to the MLM for training by cropping background image data; and responsive to the determination associated with suspending the transaction, receiving an override from the terminal, the override provided from an attendant audit that confirms the transaction item is the produce item, and flagging the at least one item image as feedback to retrain the MLM using the at least one item image and an indication that the transaction item comports with the produce item type.

12. The method of claim 11 further comprising:

retaining the at least one item image when the current item type was incorrect and the transaction item comports with the produce item type.

13. The method of claim 11 further comprising:

iterating to the training of the MLM using the at least one item image and an indication that the transaction item is associated with the produce item type.

14. The method of claim 11, wherein training further includes training the MLM to produce a consumer packaged good (CPG) item type or a non-CPG item type for each of the items.

15. The method of claim 14, wherein training the MLM further includes training each of a plurality of additional MLMs to produce a respective corresponding sub-CPG item type for each item identified as a CPG item type by the MLM.

16. The method of claim 14, wherein training the MLM further includes training the MLM to produce any of a plurality of sub-CPG item types for each item identified as a CPG item type.

17. The method of claim 11, wherein training further includes training the MLM to produce the item types further based on operator-provided price lookup (PLU) codes.

18. The method of claim 17, wherein obtaining further includes providing the operator-provided PLU codes as additional input to the MLM.

19. A system, comprising:

at least one server comprising at least one processor and a non-transitory computer-readable storage medium;

the non-transitory computer-readable storage medium comprising executable instructions;

the executable instructions when executed by at least one processor cause the at least one processor to perform operations, comprising:

receiving one or more images of an item from a scanner of a camera of a terminal, wherein the one or more images identified by an operator of the terminal as a produce item during a transaction at the terminal;

preprocessing the one or more images by cropping background image data before providing the one or more images as input to a machine-learning model (MLM);

processing the MLM a with the one or more images and receiving as output from the MLM an item type for the item; and causing the transaction to be suspended based on the item type outputted by the MLM not comporting with a produce item type associated with the produce item enabling an accurate item type classification relevant to a particular type of retail shrinkage during a self-checkout;

wherein the MLM is specifically trained to detect the particular type of retail shrinkage caused by customer identification of non-produce items as lower-cost produce items during self-checkouts; and wherein the MLM is trained on both item images and corresponding price-lookup (PLU) codes to determine whether a particular item depicted in a particular item image corresponds to an operator-provided PLU code.

20. The system of claim 19, wherein the terminal is a self-service terminal operated by a customer during the transaction or the terminal is a point-of-sale terminal operated by a cashier on behalf of the customer during the transaction.

* * * * *